Aug. 8, 1944.　　　　J. O. SAVAGE　　　　2,355,473
MILITARY VEHICLE AND BRIDGE
Filed May 19, 1943　　　2 Sheets-Sheet 1
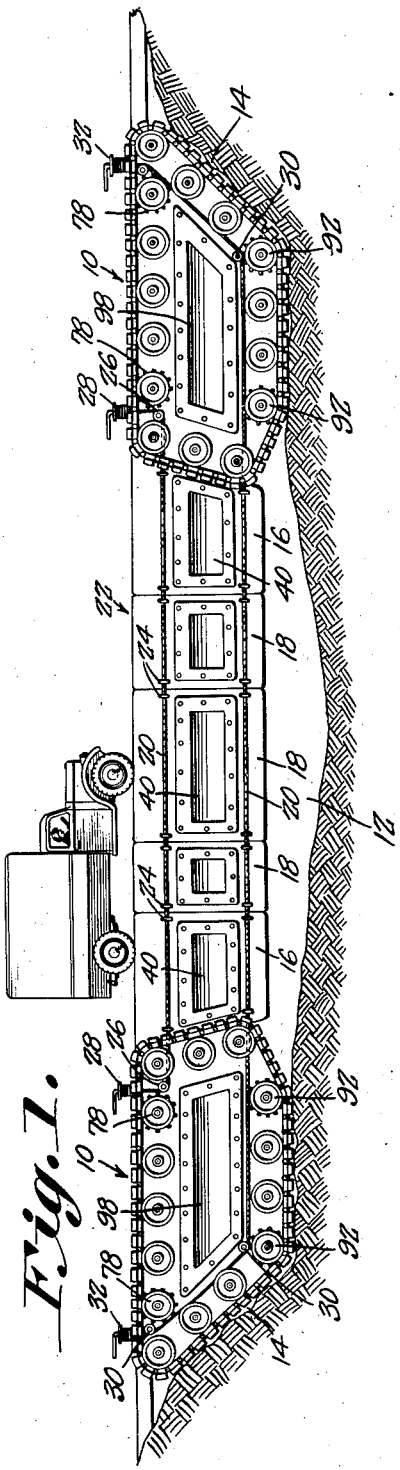
INVENTOR,
John O. Savage
BY
Victor J. Evans & Co.
ATTORNEYS

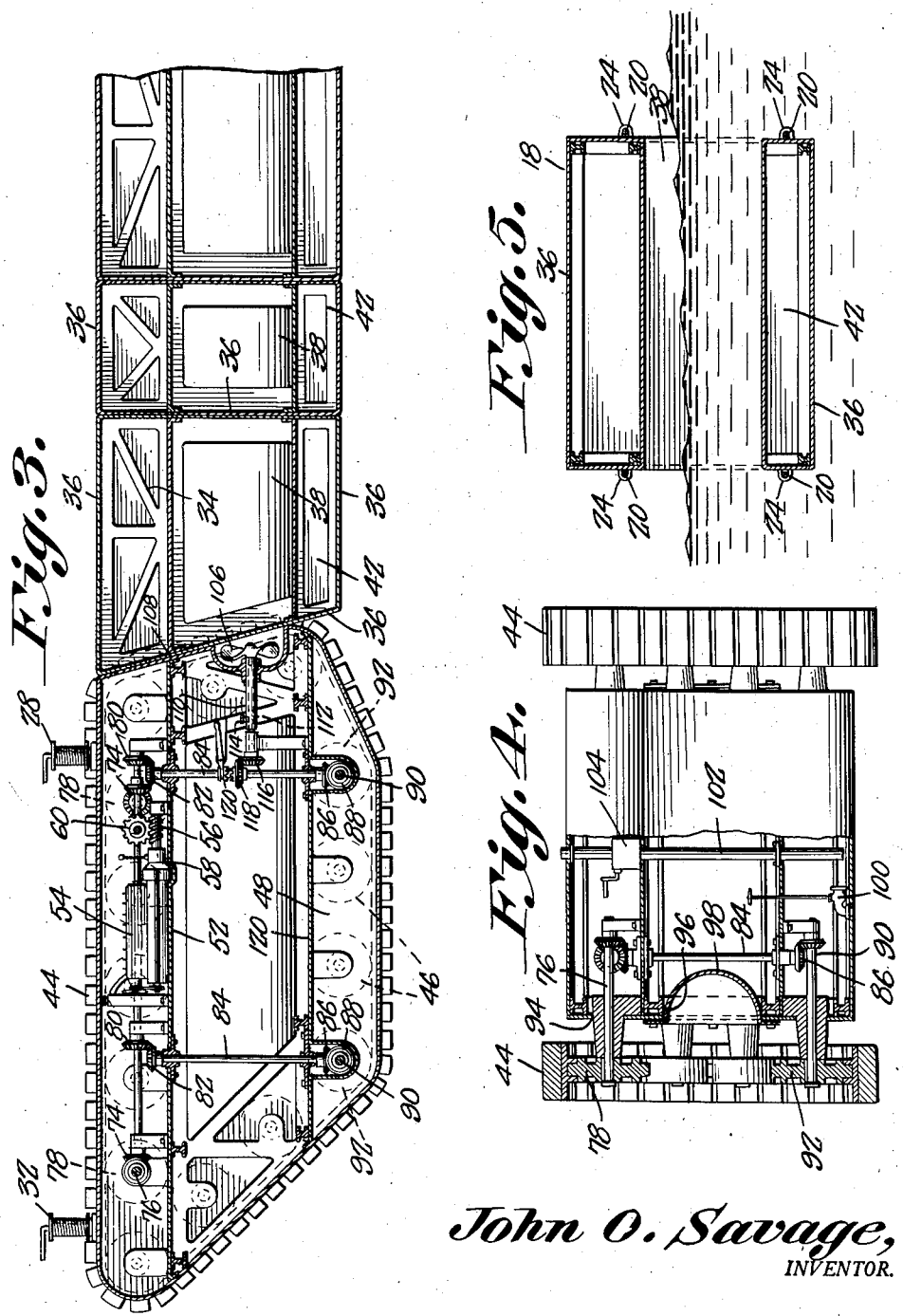

Patented Aug. 8, 1944

2,355,473

UNITED STATES PATENT OFFICE 2,355,473

MILITARY VEHICLE AND BRIDGE

John O. Savage, New York, N. Y.

Application May 19, 1943, Serial No. 487,655

4 Claims. (Cl. 14—1)

My invention relates to military vehicles, and has among its objects and advantages the provision of a vehicle of the self-propelled type which is capable of operating on land or water, and in which novel means are provided for co-action with two of the vehicles for erecting a bridge over narrow and shallow bodies of water.

In the accompanying drawings:

Figure 1 is a side view of a bridge made up of two vehicle units and spanning bodies.

Figure 2 is a top view partly in section.

Figure 3 is an enlarged longitudinal sectional view of one of the vehicles and some of the spanning bodies.

Figure 4 is an end view of one of the vehicles with a portion illustrated in section, and Figure 5 is a cross sectional view of one of the spanning bodies.

In the embodiment of the invention selected for illustration, Figures 1 and 2 illustrate two vehicles or driving units 10 located on opposite sides of a stream 12 and lying in abutting engagement with the stream banks 14. Spanning bodies 16 and 18 are arranged end to end in abutting engagement, with the bodies 16 respectively engaging the ends of the vehicles 10. Two cables 20 are arranged along each of the lateral sides of the bridge column 22, with the cables passing through eyes 24 on the bodies 16 and 18. The two upper cables are guided around grooved wheels 26 and are connected with spools 28 which may be turned for stretching the cables and clamping the tanks 10 and the bodies 16 and 18 into a unitary structure. The lower cables 20 also pass around grooved wheels 30 and connect with spools 32.

The rear end walls of the two vehicles 10 are arranged in diverging relationship when viewed according to Figure 1, and each body 16 has an inclined end fitting against the adjacent end of the vehicle 10. Thus the vehicles and the bodies may be fixedly tied into a unitary structure through tightening of the cables 20 so that the bridge column 22 may carry loads such as heavy trucks, guns and the like.

All the bodies 16 and 18 comprise a frame structure 34 and metallic walls 36. The bodies have openings 38 on opposite sides, which openings are normally covered by removable plates 40. These plates may be removed when the column 22 is set up in a stream having a considerable pressure head so that the water may flow through the column. All the bodies 16 and 18 are provided with air and watertight chambers 42 at their bottoms.

The vehicles 10 are identical in construction so that the description of one will apply to both.

In Figures 2, 3 and 4, the vehicle 10 includes the usual tread runners 44 supported on rollers 46. A water and airtight chamber 48 is provided in the bottom of the vehicle. Upon the top floor 50 of the vehicle is mounted an engine 54 which drives a worm 56. A speed changing gear unit 58 is interposed between the engine and the worm. The worm meshes with a worm gear 60 fixed to a rotatably supported shaft 62. Two shafts 64 are arranged coaxially with the shaft 62 and may be selectively connected therewith through the medium of clutches 66.

Each shaft 64 is provided with a bevel gear 68 meshing with a bevel gear 70 fixed to a shaft 72 extending along one side of the vehicle. Each shaft 72 is provided with two bevel gears 74 connected with shaft 76 to drive sprockets 78 for propelling the tread 44 on that side of the vehicle.

Each shaft 72 also includes two bevel gears 80 meshing with bevel gears 82 attached to vertical shafts 84 having bevel gears 86 connected therewith and meshing with bevel gears 88 attached to shafts 90 for driving the lower sprockets 92.

Both side walls 94 of the vehicle are provided with openings 96 normally closed by detachable plates 98. These plates may be removed to permit the passage of water through the tank in the same manner as the plates 40. In cases where the vehicle is to perform a bridge service, the chamber 48 may be filled with water through the medium of a valve 100 to sink the vehicle solidly on the river or stream bed. The water may be removed from the chamber through the medium of a pipe 102 and a pump 104.

The vehicle includes two propellers, one of which is illustrated at 106 in Figure 3. The rear wall 108 of the vehicle is depressed to provide accommodation for the propeller. This propeller is mounted on a sleeve 110 slidably mounted on a shaft 112 and normally retracted to the position of Figure 3. The sleeve may be extended and made secure to the shaft 112 by a set screw 114, as when the vehicle is to be floated across the stream. A bevel gear 116 is attached to the shaft 112 and meshes with a bevel gear 118 which may be rotatably connected with one of the shafts 84 through the medium of a clutch 120. The spacing between the wall 52 and the wall 122 of the chamber 48 is such as to provide ample room for one or more operators.

Without further elaboration, the foregoing will so fully explain my invention, that others may, by applying current knowledge, readily adapt the same for use under various conditions of service.

I claim:

1. A bridge device of the type described comprising two self-propelled vehicles, bridge bodies arranged between the vehicles with their ends in contact with each other and with the ends of the vehicles, the vehicles and bridge bodies having flat upper sides, and means connecting the bridge bodies together and to the vehicles to maintain the upper sides of the vehicles and bridge bodies in a common plane.

2. A bridge device as set forth in claim 1, wherein the contacting ends of each vehicle and the adjacent bridge body are inclined upwardly and in the direction of the front end of the vehicle and wherein said connecting means is adapted to hold the vehicles and bridge bodies with their ends in contacting relation.

3. A bridge device as set forth in claim 1, wherein the means for connecting the bridge bodies and vehicles comprises an upper and lower cable at the lateral sides of the bridge bodies, and eyes carried by the bridge bodies through which the cables pass, and means carried by the vehicles by which the cables may be placed and held under tension.

4. A bridge device as set forth in claim 1, wherein the vehicles and bridge bodies are buoyant and provided with openings extending transversely therethrough, and wherein the vehicle and bridge bodies are provided with removable plates for said openings.

JOHN O. SAVAGE.